United States Patent [19]

Gradel et al.

[11] Patent Number: 5,626,064
[45] Date of Patent: May 6, 1997

[54] LATHES FOR CUTTING STRAIGHT AND HELICAL THREADS

[76] Inventors: Pierre Gradel, Les folliets, 74130 Ayze; Serge Revillod Delisle, 226 rue de l'Eglise, 74970 Marignier, both of France

[21] Appl. No.: 483,319

[22] Filed: Jun. 7, 1995

[30] Foreign Application Priority Data

Jun. 9, 1994 [FR] France .................... 94 07399

[51] Int. Cl.⁶ .................................. B23G 1/00
[52] U.S. Cl. .................. 82/110; 409/65; 409/76; 409/18
[58] Field of Search ............. 82/110; 29/898.02; 403/43, 44, 45; 409/18, 19, 65, 74, 76, 77, 78; 415/71, 72; 451/143, 220, 222

[56] References Cited

U.S. PATENT DOCUMENTS

| 1,406,985 | 2/1922 | Johnson . | |
|---|---|---|---|
| 1,461,219 | 7/1923 | Miller . | |
| 1,853,643 | 4/1932 | Simmons . | |
| 2,405,485 | 8/1946 | Barkstrom et al. | 409/77 X |
| 2,926,366 | 3/1960 | Mannaioni | 82/110 X |
| 3,308,695 | 3/1967 | Hagerman | 82/110 |
| 3,837,753 | 9/1974 | Weiste et al. | 403/44 X |
| 5,165,137 | 11/1992 | Amrein et al. | 403/43 X |

FOREIGN PATENT DOCUMENTS

| 451131 | 10/1991 | European Pat. Off. . | |
|---|---|---|---|
| 2528389 | 1/1976 | Germany . | |
| 0120928 | 9/1980 | Japan | 409/19 |
| 370306 | 8/1963 | Switzerland . | |
| 93/16832 | 9/1993 | WIPO . | |

OTHER PUBLICATIONS

"Thread-generating Machine Adapted for Both Threadng and Forming", Machinery, vol. 74, No. 1902, pp. 446–448 (1949).

*Primary Examiner*—M. Rachuba
*Assistant Examiner*—Henry W. H. Tsai
*Attorney, Agent, or Firm*—William H. Eilberg

[57] ABSTRACT

In an otherwise conventional, mechanically controlled lathe the workpiece support spindle can be disconnected from the main mechanical drive transmission and coupled to the main drive motor via a second mechanical transmission which can introduce an angular offset between the workpiece support spindle and a milling tool that is proportional to the travel along the feed axis of a toolholder carriage carrying the milling tool. The angular offset is introduced by a coupling sleeve coupling two transmission half-shafts via helical teeth to transmit movement to the workpiece support spindle. The coupling sleeve is moved axially by the toolholder carriage. In this way straight threads and helical threads with a large pitch can be cut on an otherwise conventional lathe.

10 Claims, 4 Drawing Sheets

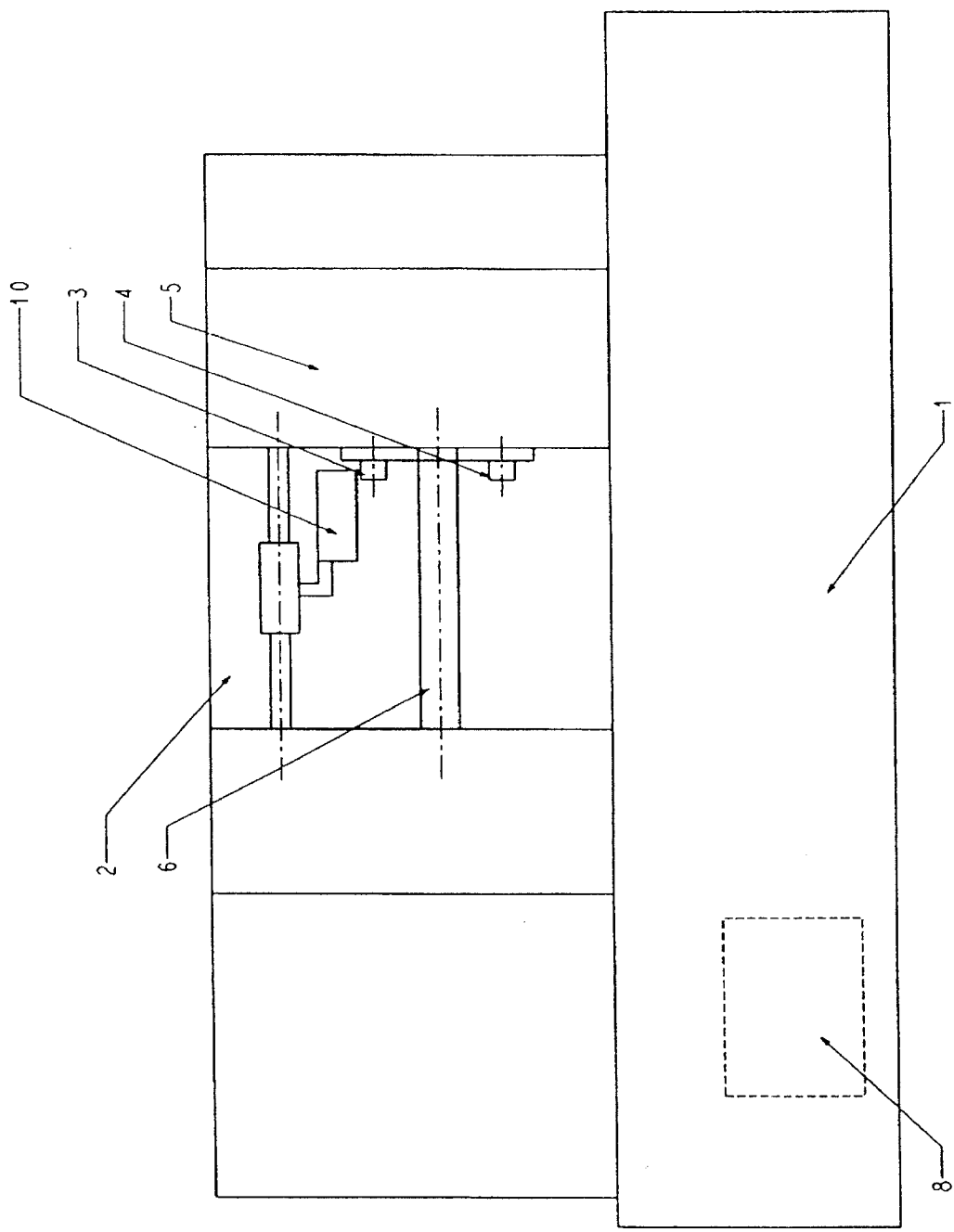

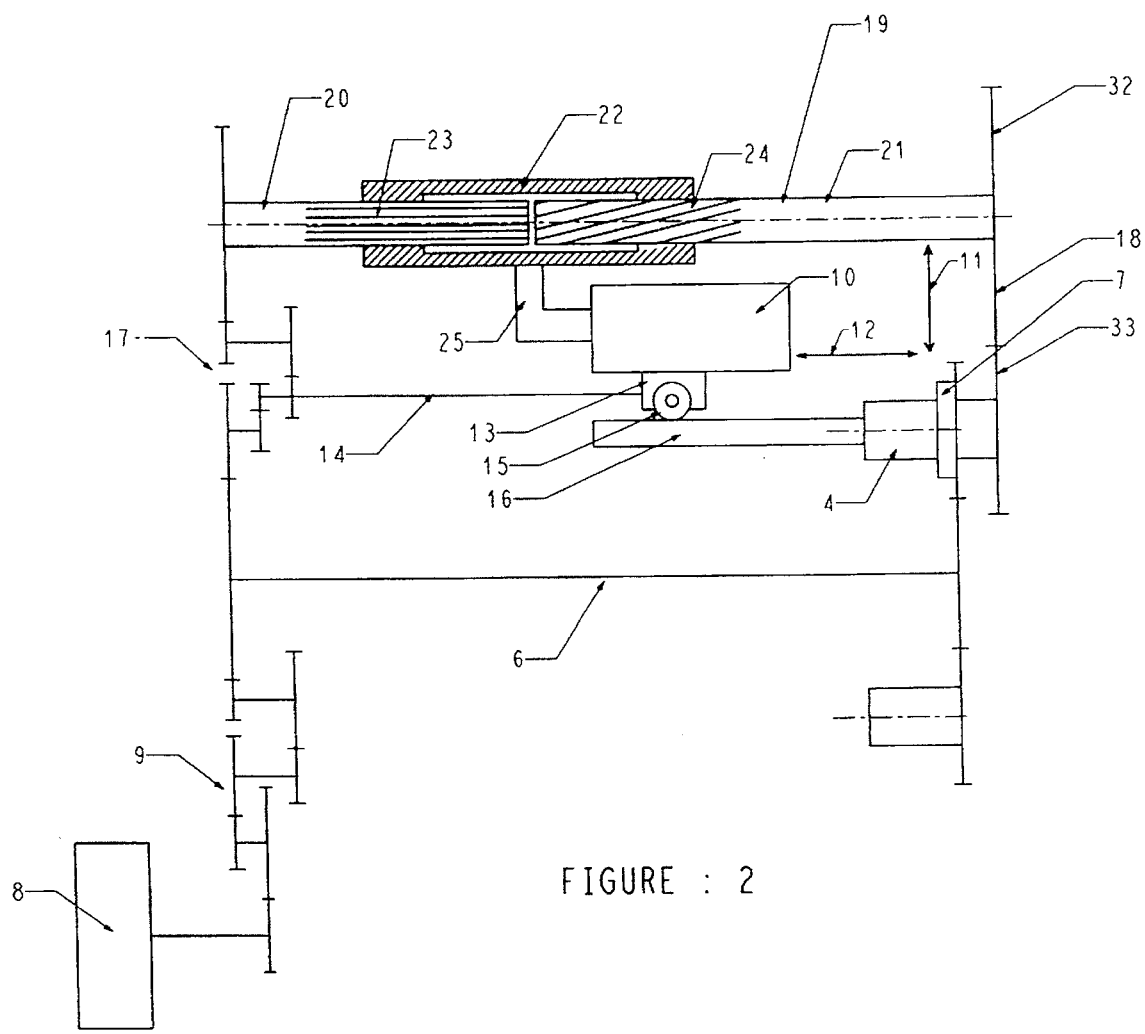
FIGURE : 2

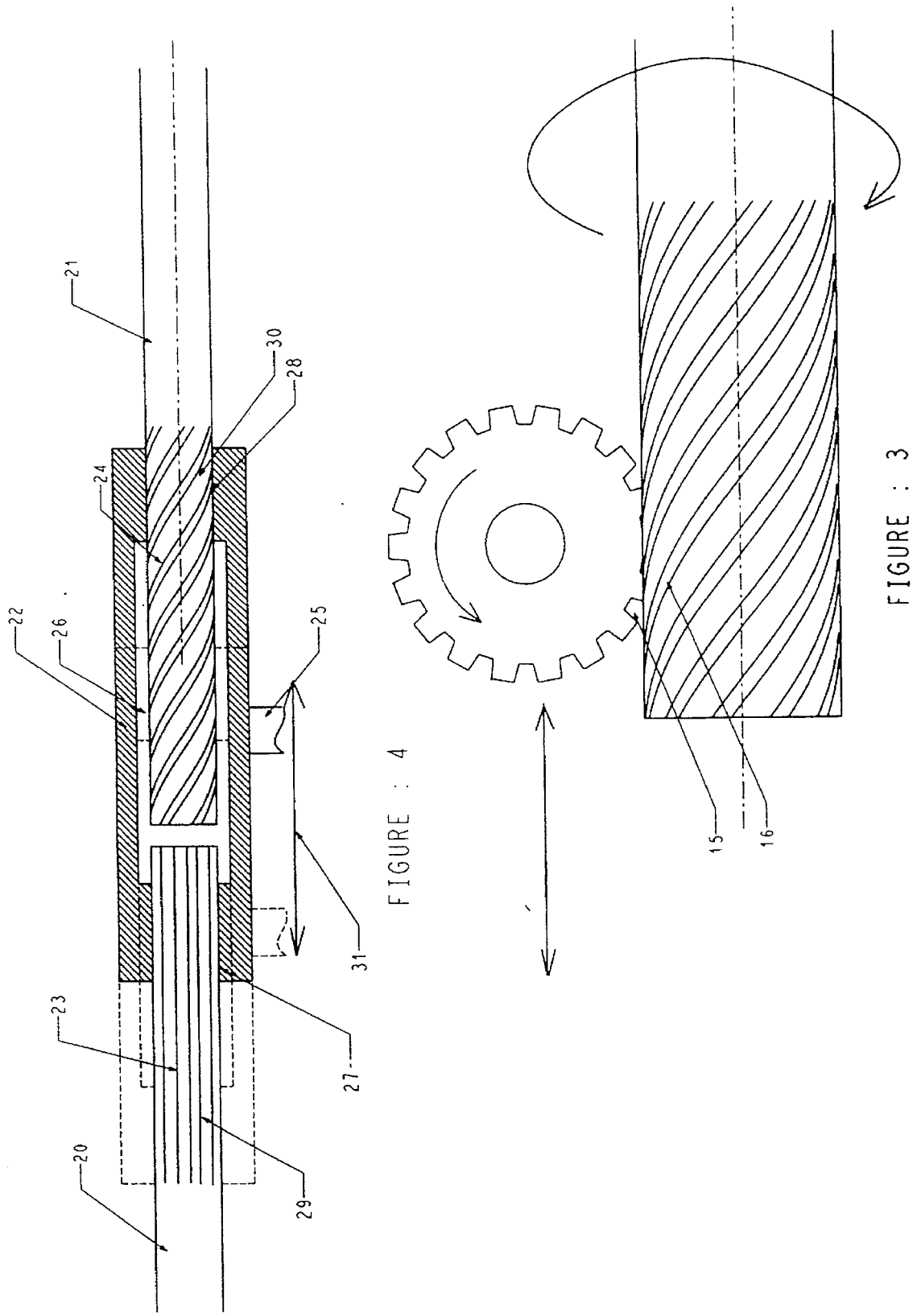

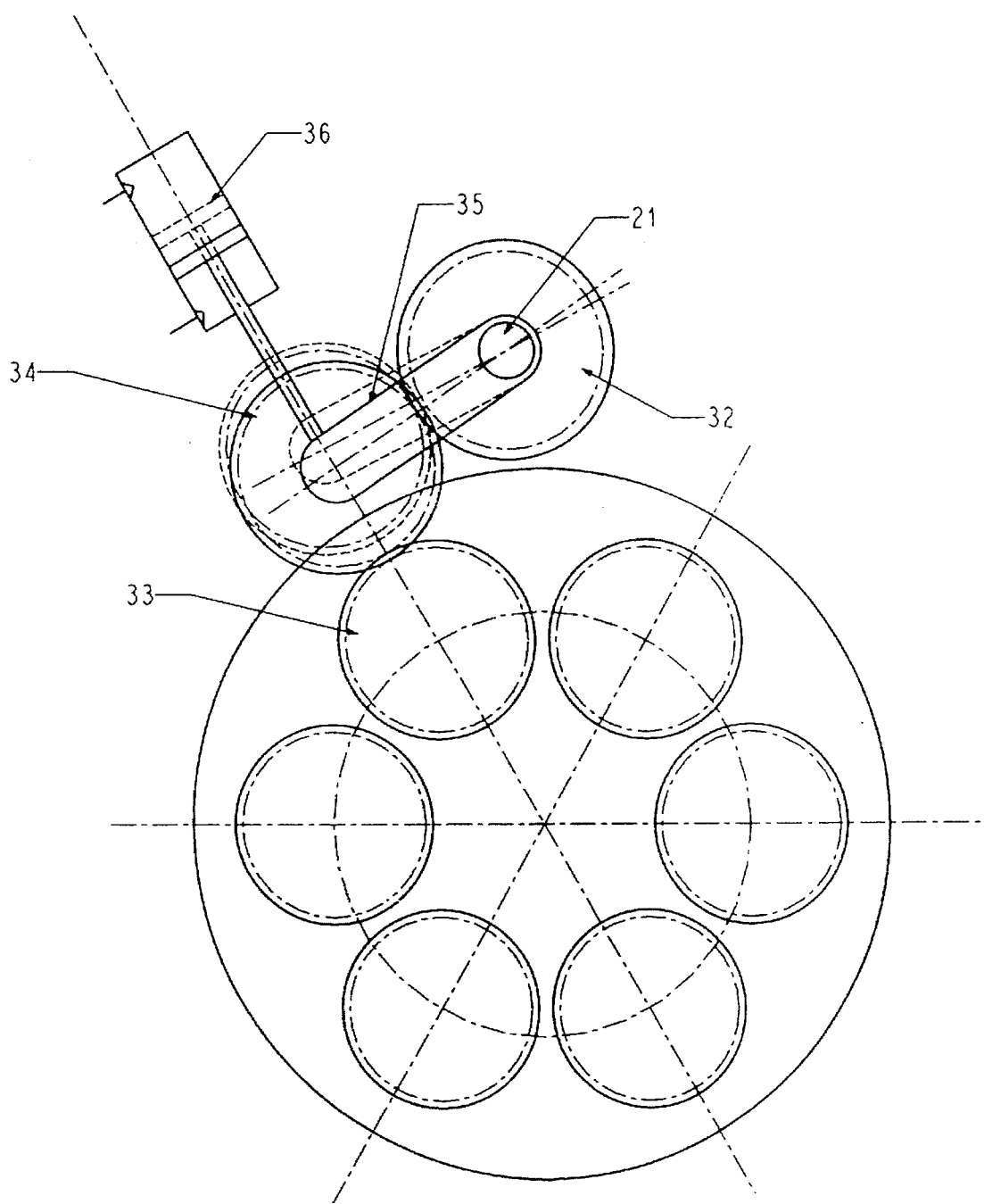
FIGURE : 5

LATHES FOR CUTTING STRAIGHT AND HELICAL THREADS

BACKGROUND OF THE INVENTION

1. Field of the Invention

The present invention concerns lathes for carrying out various machining operations on a workpiece, including turning.

2. Description of the Prior Art

A conventional lathe is a machine tool comprising a frame carrying at least one rotatable workpiece support spindle and at least one toolholder carriage movable in translation on the frame along a radial crossfeed axis perpendicular to the axis of the spindle and along a feed axis parallel to the axis of the spindle.

Drive means displace the toolholder carriage along the feed axis and in some cases along the crossfeed axis.

A first mechanical transmission to drive the workpiece support spindle is coupled to a main motor and selectively rotates the workpiece support spindle at an appropriate speed. This first mechanical transmission usually includes a feed gearbox coupled to the main motor and transmitting motion to a feed shaft selectively coupled to the workpiece support spindle, possibly via a spindle clutch.

At least one rotary toolholder spindle can usually be fitted to the toolholder carriage. It is rotated by a tool drive mechanical transmission coupled to the main motor. It carries a milling tool and rotates it at an appropriate tool speed.

Conventional lathes without numerical control include a camshaft driven by the main motor and controlling relative movement of the toolholder carriage and the workpiece support spindle in accordance with a machining cycle that can be adapted as required. A conventional lathe of this kind may have a single spindle or (and preferably) a plurality of parallel spindles mounted on a rotary turret so that the same workpiece can be presented to a plurality of toolholder carriages in succession.

Conventional lathes without numerical control are used to machine a workpiece in various ways, including turning, drilling and milling. At present, however, conventional lathes without numerical control are not able to cut longitudinal threads or helical threads with a large pitch on the workpiece. Longitudinal threads or helical threads with a large pitch have to be made by a process known as generation, for example.

Gears are usually cut on dedicated machines, for example the machine described in document U.S. Pat. No. 1,461,219. Document U.S. Pat. No. 4,034,646 describes a dedicated milling machine. Document U.S. Pat. No. 5,150,518 describes a dedicated machine for cutting internal and external helical threads. However, these dedicated machines cannot carry out a variety of machining operations such as milling, turning and drilling. As a result, a workpiece requiring a threadcutting operation and other machining operations has to be transferred from one machine tool to another, which inevitably causes defects such as lack of concentricity between the various parts of the workpiece. It also increases the cost of producing the part.

Document WO-A-93/16832 describes a lathe on which a toothed turning tool is mounted. During turning, the turning tool is progressively pivoted by rotating it about an axis which is not parallel to the axis of the spindle and additional rotation is imparted to the turning tool, proportionately to the displacement along the feed axis of the toolholder carriage on which the turning tool is mounted.

A device of this kind can cut shapes which are bodies of revolution or helical threads with a relatively short pitch on a workpiece mounted on the spindle of a lathe. However, it appears that this device is not able to cut straight threads (splines) or helical threads with a large pitch on the workpiece.

The same applies to the devices described in documents U.S. Pat. No. 1,406,985, U.S. Pat. No. 1,853,643 and CH-A-370 306, which cut helical threads with a relatively small pitch.

Straight and helical threads can be cut on numerically controlled lathes. These machines are particularly complex, however, and costly and this significantly increases the unit cost of the parts made in this way, to the degree that it is more economic to use conventional dedicated machines to cut the threads.

The problem to which the present invention is addressed is that of designing a new, simple and low-cost mechanical system for manufacturing parts including straight threads or helical threads with a large pitch on a conventional lathe without numerical control. The aim is to exploit the many machining capabilities of a conventional lathe to produce on the same workpiece not only straight or helical threads but also other shapes obtained by drilling, turning and milling. The precision of the part obtained is significantly increased by this means, and the thread cutting operations can be carried out in time that would otherwise be wasted, which substantially reduces production cost without tying up a costly machine.

Another object of the present invention is to obtain full advantage of the components of a conventional lathe so that the number of additional parts to be fitted to the lathe is minimized.

SUMMARY OF THE INVENTION

To achieve the above and further objects, the present invention consists in a lathe for carrying out various machining operations on workpieces, including turning, said lathe comprising a frame carrying:

- at least one workpiece support spindle rotatable about its axis on the frame,
- a first mechanical transmission for driving the workpiece support spindle, including a feed gearbox coupled to a main motor and driving a feed shaft of the lathe coupled selectively to the workpiece support spindle by a first spindle clutch selectively to rotate the workpiece support spindle at an appropriate speed from the main motor,
- at least one toolholder carriage mobile in translation on the frame along a radial crossfeed axis perpendicular to the axis of the workpiece support spindle and along a feed axis parallel to the axis of the workpiece support spindle, with drive means for displacing the toolholder carriage along the feed axis,
- at least one rotary toolholder spindle on the toolholder carriage adapted to be rotated by a tool drive mechanical transmission coupled to the main motor and adapted to carry a milling tool and to rotate it at an appropriate tool speed, wherein:
- the orientation of the rotary toolholder spindle on the toolholder carriage is adjustable,
- a second mechanical transmission for driving the workpiece support spindle and comprising a second gearbox coupled to the main motor selectively rotates the workpiece support spindle via a second spindle clutch, said second mechanical transmission is adapted to rotate the workpiece support spindle with a variable demultiplication ratio calculated to obtain a particular integer ratio between the rotation speed of the milling tool and the rotation speed of the workholder support spindle, and said second mechanical transmission for driving the workpiece support spindle comprises a mechanical angular offset device for angularly offsetting the workpiece support spindle about its axis by an amount proportional to the displacement of the toolholder carriage along the feed axis so that the milling tool can cut in the workpiece helical or straight threads the number of which is equal to said ratio of rotation speeds.

In one advantageous embodiment of the invention:

the mechanical angular offset device comprises an intermediate shaft in said second mechanical transmission driving the workpiece support spindle and formed of two successive coaxial half-shafts coupled together to rotate together by a sliding coaxial coupling sleeve, the coupling sleeve is rotationally coupled to a corresponding coupling end of the first half-shaft by first teeth allowing axial relative displacement of the coupling sleeve, the coupling sleeve is rotationally coupled to a corresponding coupling end of the second half-shaft by second teeth allowing axial relative displacement of the coupling sleeve, and the coupling sleeve is displaced in axial translation directly or indirectly by the toolholder carriage to which it is coupled by a mechanical coupling allowing it to rotate.

In a first application of the invention, the first and second teeth are splines to produce an angular offset between the milling tool and the workpiece support spindle that is constant and independent of the displacement of the toolholder carriage and the coupling sleeve along the feed axis. Longitudinal teeth or splines are produced on the workpiece.

In a second application of the invention, the first teeth and/or the second teeth are helical teeth to impart to the workpiece support spindle an annular offset proportional to the displacement of the toolholder carriage and the coupling sleeve along the feed axis. Helical teeth are produced on the workpiece.

Other objects, features and advantages of the present invention will emerge from the following description of specific embodiments of the invention given with reference to the appended drawings.

BRIEF DESCRIPTION OF THE DRAWINGS

FIG. 1 is a schematic general arrangement drawing of a conventional, mechanically controlled lathe modified in accordance with the invention.

FIG. 2 shows the kinematic system of a conventional multispindle lathe modified in accordance with the invention.

FIG. 3 shows a milling tool cutting a thread on the lateral surface of a workpiece on a lathe modified in accordance with the invention.

FIG. 4 is a view in longitudinal section of a coupling sleeve fitted to the ends of two half-shafts on a lathe modified in accordance with the invention.

FIG. 5 is an end-on view of the spindle turret of a multiple spindle lathe modified in accordance with the invention with a swing-arm type clutch device.

DETAILED DESCRIPTION OF THE PREFERRED EMBODIMENT

To cut a straight or helical thread the invention uses a conventional mechanical lathe, either a single-spindle or a multiple spindle lathe, which is not numerically controlled. The drawings show a multiple spindle lathe by way of example only.

The invention can utilize any conventional single-spindle or multiple spindle mechanical lathe. FIGS. 1 and 2 show by way of example only the relative disposition of the main component parts of a conventional lathe of this kind.

In the embodiment of the invention shown in FIGS. 1 and 2, the conventional lathe includes a frame 1 carrying all the components of the lathe. The workpiece is machined in a central machining area 2 which is usually accessible to the user so that the user can adjust the tools. In the machining area 2 there are two workpiece support spindles 3 and 4 mounted on a rotary spindle turret mounted in a turret frame 5. The turret includes a mechanical transmission device for rotating the workpiece support spindles 3 and 4 coupled to a feed shaft 6 passing across the machining area 2. The feed shaft 6 of the lathe is selectively coupled to the workpiece support spindle 4 by a first spindle clutch 7 (see FIG. 2) to rotate the workpiece support spindle 4 selectively at an appropriate speed during conventional machining operations carried out on the lathe.

The other end of the feed shaft 6 is coupled to a main motor 8 of the lathe by a feed gearbox 9.

The feed gearbox 9, the feed shaft 6 of the lathe and the first spindle clutch 7 constitute a first mechanical transmission for driving the workpiece support spindle 4 that is used for the conventional machining operations carried out on the lathe.

A multiple spindle lathe usually includes a plurality of toolholder carriages, for example the toolholder carriage 10 that is able to move in translation on the frame 1 along a radial crossfeed axis 11 perpendicular to the axis of the spindle 4 and along a feed axis 12 parallel to the axis of the spindle 4. The toolholder carriage 10 is driven along the feed axis 12 by the conventional systems of the lathe, which are not shown in the figures.

The toolholder carriage 10 carries a rotary toolholder spindle 13 that is rotated by a mechanical transmission 14 for driving the tool coupled to the main motor 8. The rotary toolholder spindle 13 carries a milling tool 15 which is therefore rotated at an appropriate tool speed selected according to the necessary cutting rate. As shown in FIG. 2, and to a larger scale in FIG. 3, the milling tool 15 engages with the surface of the workpiece 16 carried by the workpiece support spindle 4.

The orientation of the rotary toolholder spindle 13 on the toolholder carriage 10 can be adjusted to suit the pitch of the threads to be produced on the workpiece 16.

For cutting threads, the invention provides a second mechanical transmission for driving the workpiece support spindle comprising a second gearbox 17 coupled to the main motor 8 and preferably coupled to the feed gearbox 9 to benefit from the speed reducing capabilities of the feed gearbox 9. The second gearbox 17 selectively drives the workpiece support spindle 4 via transmission means including a second spindle clutch 18. Of course, the workpiece support spindle 4 can be driven either by the first mechanical transmission comprising the feed shaft 6 of the lathe or by the second mechanical transmission comprising the second gearbox 17 and the second spindle clutch 18. Accordingly, to cut threads the first spindle clutch 7 is disengaged and the second spindle clutch 18 is engaged.

The second mechanical transmission rotates the workpiece support spindle 4 with a demultiplication ratio which can be varied in accordance with the selected ratios of the second gearbox 17 to obtain a particular integer ratio between the rotation speed of the milling tool 15 and the rotation speed of the workpiece support spindle 4.

The second mechanical transmission for driving the workpiece support spindle 4 comprises an angular offset mechanical device for angularly offsetting the workpiece support spindle about its axis in proportion to the displacement of the toolholder carriage 10 along the feed axis. To this end, in the embodiment of the invention shown, an intermediate shaft 19 couples the output of the second gearbox 17 to the second clutch 18. The intermediate shaft 19 comprises two successive and coaxial half-shafts 20 and 21 coupled together to rotate together by a sliding coaxial coupling sleeve 22.

The coupling sleeve 22 is coupled to, in order to rotate with, the corresponding coupling end 23 of the first shaft 20 by first teeth enabling relative axial displacement of the sleeve 22 on the first half-shaft 20. Likewise, the coupling sleeve 22 is coupled to, in order to rotate with, the corresponding coupling end 24 of the second half-shaft 21 by second teeth enabling relative axial displacement of the sleeve 22 on the second half-shaft 21.

The coupling sleeve 22 is moved in axial translation by the toolholder carriage 10, to which it is coupled by a mechanical coupling 25.

The coupling sleeve 22 can be demounted and can be interchangeable.

Likewise, the half-shafts 20 and 21, or at least their ends 23 and 24 coupled to the coupling sleeve 22, can advantageously be demountable and interchangeable.

This allows the teeth coupling the coupling sleeve 22 and the half-shafts 20 and 21 to be changed to change the pitch of the threads cut into the workpiece 16.

In a first application of the invention the first and second teeth are splines. In this case, and regardless of the position of the toolholder carriage 10, the second half-shaft 21 retains a constant angular position relative to the first half-shaft 20. This produces a constant angular offset between the milling tool 15 and the workpiece support spindle 4 and this offset is independent of the displacement of the toolholder carriage 10 and the coupling sleeve 22 along the feed axis.

In a second application of the invention, the first and/or second teeth are helical teeth. FIG. 4 shows by way of example one embodiment of the coupling sleeve 22 having an opened out central part 26 with a greater inside diameter and two end parts 27 and 28 with diameters which match the respective diameters of the first half-shaft 20 and the second half-shaft 21. The first end part 27 includes splines meshing with corresponding splines 29 on the first half-shaft 20. The second end 28 includes helical teeth meshing with corresponding helical teeth 30 on the second half-shaft 21. If the coupling sleeve 22 is moved axially, as shown by the arrows 31, by the mechanical coupling 25 between it and the toolholder carriage 10, the coupling sleeve 22 continues to be constrained to rotate with the first half-shaft 20 and the helical teeth 30 cause relative rotation of the second half-shaft 21 by an amount proportional to the axial displacement of the coupling sleeve 22.

The helical teeth 30 necessarily have a relatively large pitch, enabling sliding of the second end part 28 of the coupling sleeve 22 over the corresponding teeth. This embodiment of the sleeve 22 with splines and helical teeth is for cutting threads with a large pitch.

To reduce the pitch of the threads cut in the workpiece 16 a sleeve 22 is used which also has helical teeth in the first end part 27, with corresponding helical teeth replacing the splines 29 on the first half-shaft 20.

In the embodiment of the invention shown in FIG. 2 the half-shafts 20 and 21 are parallel to the workpiece support spindle 4 and the coupling sleeve 22 is attached directly to the toolholder carriage 10 so that it moves in axial translation with it. The coupling 25 allows the coupling sleeve 22 to rotate freely about its axis. The coupling sleeve 22 is in the machining area 2 of the lathe, where it is directly accessible for adjustment and replacement.

The second half-shaft 21 is coupled to the workpiece support spindle 4 by a transmission comprising a first toothed wheel 32 coupled to the half-shaft 21 and a second toothed wheel 33 coupled to the workpiece support spindle 4.

Advantageously, and as shown in FIG. 5, the second spindle clutch 18 is also a toothed wheel gear type device: the first toothed wheel 32 is coupled to the end of the second half-shaft 21 and meshes with a mobile toothed wheel 34 mounted on a swing-arm 35 pivoting about the axis of the first toothed wheel 32. The swing-arm 35 can move between a first position shown in full outline in FIG. 5 and in which the mobile toothed wheel 34 meshes with the second toothed wheel 33 mounted at the end of the workpiece support spindle 4 and a retracted second position shown in chain-dotted outline in which the mobile toothed wheel 34 is separated from the second toothed wheel 33 to disengage the clutch. The swing-arm 35 is moved between its clutch engaged and clutch disengaged positions by a piston-and-cylinder actuator 36.

The transmission comprising the toothed wheels 32, 33 and 34 of the second spindle clutch 18 can have a unity gear ratio, as shown in FIG. 5, or a gear ratio other than unity, advantageously a ratio greater than unity as in the embodiment shown in FIG. 2, for example.

The operation of the lathe when modified in accordance with the invention is as follows: the milling tool 15 and the workpiece support spindle 4 are rotated in a synchronized manner by the main motor 8 of the lathe, the gear ratio of the second gearbox 17 being chosen to produce an integer ratio between the rotation speeds. This ratio between the rotation speeds defines the number of teeth or threads to be cut on the workpiece 16. The first clutch 7 is disengaged, so disconnecting the workpiece support spindle 4 from the feed shaft 6 of the lathe. A coupling sleeve 22 and half-shafts 20 and 21 are chosen having teeth defining the required pitch of the threads to be cut on the workpiece 16. The milling tool 15 driven by the main motor 8 via the transmission 14 is thus rotated synchronously with the workpiece support spindle 4 when the toolholder carriage 10 is stationary. Displacement of the toolholder carriage 10 along the feed axis 12 causes simultaneous displacement of the coupling sleeve 22. With helical teeth coupling the coupling sleeve 22 and the half-shafts 20 and 21, and with a unity transmission ratio via the toothed wheels 32, 33 and 34, this simultaneous displacement of the coupling sleeve 22 imparts additional relative rotation to the second half-shaft 21, the wheels 32 and 33 and the workpiece support spindle 4. This additional relative rotation is proportional to the displacement of the toolholder carriage 10. It causes the milling tool 15 to cut in the workpiece 16 helical threads at an angle to the longitudinal axis equal to the sum of the angles formed by the helical teeth of the half-shafts 20 and 21. The resulting helix angle is totally accurate. To increase the helix angle the transmission ratio of the toothed wheels 32, 33 and 34 can be greater than one, which facilitates sliding of the helical teeth of the half-shafts 20 and 21.

In the case of a multiple spindle lathe, at least one of the workstations can be modified in accordance with the invention. The other workstations can be equipped in the conventional way, for example, with turning, drilling or milling tools in order to carry out on the same workpiece 16 a plurality of successive machining operations, in time that would otherwise be wasted, without demounting the workpiece.

The present invention is not limited to the embodiments explicitly described but includes all variants and generalizations thereof within the scope of the following claims.

There is claimed:

1. Lathe for carrying out various machining operations on workpieces, including turning, said lathe comprising a frame carrying:
    at least one workpiece support spindle rotatable about its axis on said frame,
    a first mechanical transmission for driving said workpiece support spindle, including a feed gearbox coupled to a main motor and driving a feed shaft of said lathe coupled selectively to said workpiece support spindle by a first spindle clutch selectively to rotate said workpiece support spindle at an appropriate speed from said main motor,
    at least one toolholder carriage mobile in translation on said frame along a radial crossfeed axis perpendicular to the axis of the workpiece support spindle and along a feed axis parallel to the axis of said workpiece support spindle, with drive means for displacing said toolholder carriage along said feed axis,
    at least one rotary toolholder spindle on said toolholder carriage adapted to be rotated by a tool drive mechanical transmission coupled to said main motor and adapted to carry a milling tool and to rotate it at an appropriate tool speed,
    wherein:
        the orientation of said rotary toolholder spindle on said toolholder carriage is adjustable,
        a second mechanical transmission for driving said workpiece support spindle and comprising a second gearbox coupled to said main motor selectively rotates said workpiece support spindle via a second spindle clutch,
        said second mechanical transmission is adapted to rotate said workpiece support spindle with a variable demultiplication ratio calculated to obtain a particular integer ratio between the rotation speed of said milling tool and the rotation speed of said toolholder spindle, and
        said second mechanical transmission for driving said workpiece support spindle comprises a mechanical angular offset device for angularly offsetting said workpiece support spindle about its axis by an amount proportional to the displacement of said toolholder carriage along said feed axis so that said milling tool can cut in said workpiece helical threads, the number of which is equal to said ratio of rotation speeds, or longitudinal straight threads,
        and wherein:
            said mechanical angular offset device comprises an intermediate shaft in said second mechanical transmission driving said workpiece support spindle and formed of successive coaxial first and second half-shafts coupled together to rotate together by a sliding coaxial coupling sleeve,
            said coupling sleeve is rotationally coupled to a corresponding coupling end of said first half-shaft by first teeth allowing axial relative displacement of said coupling sleeve,
            said coupling sleeve is rotationally coupled to a corresponding coupling end of said second half-shaft by second teeth allowing axial relative displacement of said coupling sleeve, and
            said coupling sleeve is displaced in axial translation directly or indirectly by said toolholder carriage to which it is coupled by a mechanical coupling allowing it to rotate.

2. Lathe according to claim 1 wherein said first teeth or said second teeth are helical teeth to impart to said workpiece support spindle an angular offset proportional to the displacement of said toolholder carriage and said coupling sleeve along said feed axis, so that helical teeth are cut on said workpiece.

3. Lathe according to claim 1 wherein said first and second teeth are splines to produce an angular offset between said milling tool and said workpiece support spindle that is constant and independent of the displacement of said toolholder carriage and said coupling sleeve along said feed axis, so that straight longitudinal threads are cut on said workpiece.

4. Lathe according to claim 1 wherein said first teeth and said second teeth are helical teeth to impart to said workpiece support spindle an angular offset proportional to the displacement of said toolholder carriage and said coupling sleeve along said feed axis, so that helical teeth are cut on said workpiece.

5. Lathe according to claim 1 wherein said coupling sleeve is demountable and interchangeable.

6. Lathe according to claim 1 wherein at least the coupling ends of said half-shafts coupled to said coupling sleeve are demountable and interchangeable.

7. Lathe according to claim 1 wherein said half-shafts are parallel to said workpiece support spindle and said coupling sleeve is fastened to said toolholder carriage so as to move in axial translation with it.

8. Lathe according to claim 1 wherein said coupling sleeve is in the machining area of said lathe.

9. Lathe according to claim 1 wherein said second spindle clutch comprises a first toothed wheel and a mobile toothed wheel meshing with each other, said mobile toothed wheel being mounted on a swing-arm rotatable about the axis of said first toothed wheel, said first toothed wheel being rotated by said second mechanical transmission, said mobile wheel selectively meshing with a second toothed wheel mounted at the end of said workpiece support spindle when said swing-arm is in a clutch engaged position and being held away from said second toothed wheel when said swing-arm is in a clutch disengaged position.

10. Lathe according to claim 9 wherein the transmission ratio of said toothed wheels of said second spindle clutch is greater than unity.

* * * * *